United States Patent
Falcoz

(10) Patent No.: US 11,386,575 B2
(45) Date of Patent: Jul. 12, 2022

(54) METHOD FOR LOCATING A TARGET FROM AN ELLIPTICAL CONTOUR

(71) Applicant: AIRBUS DEFENCE AND SPACE SAS, Toulouse (FR)

(72) Inventor: Alexandre Falcoz, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/601,264

(22) PCT Filed: Mar. 31, 2020

(86) PCT No.: PCT/EP2020/059024
§ 371 (c)(1),
(2) Date: Oct. 4, 2021

(87) PCT Pub. No.: WO2020/201239
PCT Pub. Date: Oct. 8, 2020

(65) Prior Publication Data
US 2022/0172393 A1    Jun. 2, 2022

(30) Foreign Application Priority Data
Apr. 5, 2019  (FR) ..................................... 1903647

(51) Int. Cl.
*G06T 7/73*        (2017.01)
*G06V 10/44*       (2022.01)
(Continued)

(52) U.S. Cl.
CPC ................ *G06T 7/73* (2017.01); *B64G 1/646* (2013.01); *G06T 7/64* (2017.01); *G06V 10/25* (2022.01);
(Continued)

(58) Field of Classification Search
CPC .......... G06T 7/13; G06T 7/136; G06T 7/543; G06T 7/60; G06T 7/64; G06T 7/70;
(Continued)

(56) References Cited

U.S. PATENT DOCUMENTS

2008/0012860 A1* 1/2008 Klefenz et al. ...... G06V 40/193
345/441

OTHER PUBLICATIONS

Ouellet et al., "Precise ellipse estimation without contour point extraction", Machine Vision and Applications, vol. 21, No. 1, May 7, 2008, pp. 59-67.
(Continued)

*Primary Examiner* — Andrew W Johns
(74) *Attorney, Agent, or Firm* — Nixon & Vanderhye P.C.

(57) ABSTRACT

A method for locating a target relative to a vehicle is disclosed. The target includes at least one three-dimensional external component presenting a quadratic surface. The method includes the steps of capturing an image of the target having an area of interest in which the external component of the target is visible in the form of an elliptical contour, for each of the pixels of the area of interest in the image, calculating an intensity gradient of the image around the pixel, and determining, based on the intensity gradient, the parameters of a line presenting a direction normal to the gradient at the pixel, selecting, among the set of determined lines, a set of lines that are tangents to the elliptical contour, and estimating the parameters of the elliptical contour on the image based on the parameters of the tangents to the elliptical contour.

9 Claims, 4 Drawing Sheets

(51) Int. Cl.
 *G06T 7/64* (2017.01)
 *G06V 10/25* (2022.01)
 *B64G 1/64* (2006.01)
 *G06V 10/50* (2022.01)

(52) U.S. Cl.
 CPC ............ *G06V 10/44* (2022.01); *G06V 10/507* (2022.01); *G06T 2207/30241* (2013.01); *G06T 2207/30252* (2013.01); *G06V 2201/07* (2022.01)

(58) Field of Classification Search
 CPC ............ G06T 7/73; G06T 2207/30241; G06T 2207/30252; G06K 9/00; G06V 10/25; G06V 10/44; G06V 10/507; G06V 30/147; G06V 30/1801; G06V 30/18086; G06V 30/182; G06V 30/1823; G06V 30/1826; G06V 30/1829; G06V 30/1831; G06V 30/1834; G06V 30/1837
 See application file for complete search history.

(56) References Cited

OTHER PUBLICATIONS

Ouellet et al., "A Simple Operator for Very Precise Estimation of Ellipses", Fourth Canadian Conference on Computer and Robot Vision (CRV '07), 2007, pp. 21-28.
Cai et al., "An efficient circle detector not relying on edge detection", Advances in Space Research, vol. 57, No. 11, Mar. 21, 2016, pp. 2359-2375.
Liu et al., "Effective method for ellipse extraction and integration for spacecraft images", Optical Engineering, vol. 52, No. 5, May 1, 2013, pp. 57002-1-57002-17.
Petit et al., "Vision-Based Space Autonomous Rendezvous: A Case Study", IEEE/RSJ International Conference on Intelligent Robots and Systems, Sep. 25-30, 2011, 6 pages.
French International Search Report with English Translation for PCT/EP2020/059024, dated May 4, 2020, 4 pages.
French Written Opinion of the ISA for PCT/EP2020/059024, dated May 4, 2020, 7 pages.

* cited by examiner

METHOD FOR LOCATING A TARGET FROM AN ELLIPTICAL CONTOUR

CROSS REFERENCE TO RELATED APPLICATIONS

The present application is a National Phase of International Application Number PCT/EP2020/059024 filed Mar. 31, 2020, which designated the U.S. and claims priority benefits from French Application Number FR 1903647 filed Apr. 5, 2019, the entire contents of each of which are hereby incorporated by reference.

TECHNICAL FIELD

This application relates to a method for processing an image of a target, in order to locate the target relative to a vehicle, the target having at least one three-dimensional external component presenting a quadratic surface. The invention falls within the context of an air or space rendezvous.

PRIOR ART

An example of a space rendezvous is typically the docking of a spacecraft to a target such as the International Space Station. Another example is the docking of a satellite to another satellite. During such a rendezvous, a moving approach vehicle must position itself precisely relative to a moving target whose three-dimensional structure can be complex. The navigation of the approach vehicle is essentially based on an analysis of images of the moving target captured from the approaching vehicle, in order to accurately determine the placement of the moving target, meaning its relative position and its orientation relative to the approaching vehicle.

To do this, there are known algorithms for detecting and tracking targets, which use a three-dimensional model of the target. These algorithms comprise the capturing of one or more images of the target from the vehicle, and estimating the placement of the moving target based on the three-dimensional model of the target. An example of such an algorithm is for example described in the publication by A. Petit et al., "Vision-based Space Autonomous Rendezvous: A Case Study", published in 2011 IEEE/RSJ International Conference on Intelligent Robots and Systems, Sep. 25-30, 2011.

This type of algorithm has several disadvantages, and in particular it involves intensive calculations linked to having to load and manipulate a three-dimensional model of the target on the one hand, and to the algorithm itself on the other hand. This implies significant computation time which is not always compatible with the requirement of detecting and tracking the target in real time. If the algorithm is implemented on board the vehicle, it is therefore necessary to load special hardware on board the vehicle, while if it is implemented on the ground, it is necessary to ensure sufficiently rapid exchanges between the vehicle and the ground to enable the vehicle to track the target accurately.

Another problem associated with the target detection and tracking algorithm using a three-dimensional model of the target is that the algorithm cannot easily be adapted to different types of target, since the three-dimensional model is specific to a particular type of target. It is therefore necessary to provide as many models as there are types of targets.

There is therefore a need for a less complex alternative that can easily be used on different types of targets.

SUMMARY

The invention aims to provide an improvement to existing solutions for the detection of a target from a vehicle.

In particular, an object of the invention is to provide a method for locating a target which is rapid to implement and inexpensive in terms of computation capacity.

Another object of the invention is to be able to be implemented on different types or models of targets.

In this regard, the invention relates to a method for locating a target relative to a vehicle, the target comprising at least one three-dimensional external component presenting a quadratic surface, the method being implemented by a computer and comprising:

capturing an image of the target comprising an area of interest in which the external component of the target is visible in the form of an elliptical contour, for each of a plurality of pixels of the area of interest in the image, calculating an intensity gradient of the image around the pixel, and determining, based on the intensity gradient, the parameters of a line presenting a direction normal to the gradient at said pixel, selecting, among the set of determined lines, a set of lines that are tangents to the elliptical contour, and estimating the parameters of the elliptical contour on the image based on the parameters of the tangents to the elliptical contour.

In one embodiment, the area of interest is an ellipse delineated around the elliptical contour of the image, and an intensity gradient is calculated for all pixels of the area of interest in the image.

In one embodiment, the step of selecting lines that are tangents to the elliptical contour comprises:

calculating, for each pixel, an angle formed by the line presenting a direction normal to the gradient at said pixel and by a line connecting said pixel to an estimated center of the elliptical contour, and selecting the line presenting a direction normal to the gradient at said pixel as a tangent to the elliptical contour if the calculated angle is equal to a right angle plus or minus a predetermined tolerance.

In one embodiment, the parameters of the elliptical contour are estimated by a least squares algorithm.

In one embodiment, the method further comprises, once the tangents to the elliptical contour have been selected, producing a histogram of said tangents as a function of the distance between an estimated center of the elliptical contour and the pixel at which each tangent is respectively calculated.

The histogram can comprise two peaks respectively corresponding to an inner edge and an outer edge of the elliptical contour on the image, and the method then comprises dividing the tangents into two sets respectively corresponding to each edge, and the step of estimating the parameters of the elliptical contour on the image is carried out respectively for the inner edge and for the outer edge, based on the parameters of the tangents respectively belonging to the two sets.

In one embodiment, the step of capturing the image of the target comprising an area of interest comprises a step of capturing an image of the target in which the three-dimensional external component is visible in the form of an elliptical contour, and a step of delineating an area of interest around said contour.

The delineation of the area of interest can be implemented based on a previous estimate of the position of the target relative to the vehicle and based on the trajectory of the vehicle relative to the target.

An object of the invention is also a computer program product, comprising code instructions for implementing the method as described above, when it is implemented by a computer.

The invention also relates to a computer configured to implement the method according to the above description.

The method proposed by the invention is based on an analysis of the projection onto an image of a three-dimensional external component of a target presenting a quadratic surface, which is typically the case of a thruster nozzle, a satellite launcher interface ring, most satellites being equipped with such a ring, or a docking ring of a space module such as the International Space Station.

Detecting the target and estimating its position relative to the vehicle can be achieved by defining the parameters of the ellipse formed by this three-dimensional external component on an image of the target captured from the vehicle. It is therefore not necessary to manipulate a complex three-dimensional model of the target, and the time and/or capacities for the calculations required to implement the method are reduced.

In addition, the absence of relying on a model of the target makes the method usable on a wide variety of targets, provided that they have an external component presenting a quadratic surface, which is the case with most spacecraft.

In some cases, increased detection accuracy can be obtained by performing specific detection processing for the inner edge and outer edge of the elliptical contour appearing on the image (which is the projection onto the image of the external component presenting a quadratic surface of the target).

BRIEF DESCRIPTION OF DRAWINGS

Other features, details and advantages will be apparent from reading the detailed description below, and from analyzing the accompanying drawings, in which.

DESCRIPTION OF EMBODIMENTS

Figure 2A:
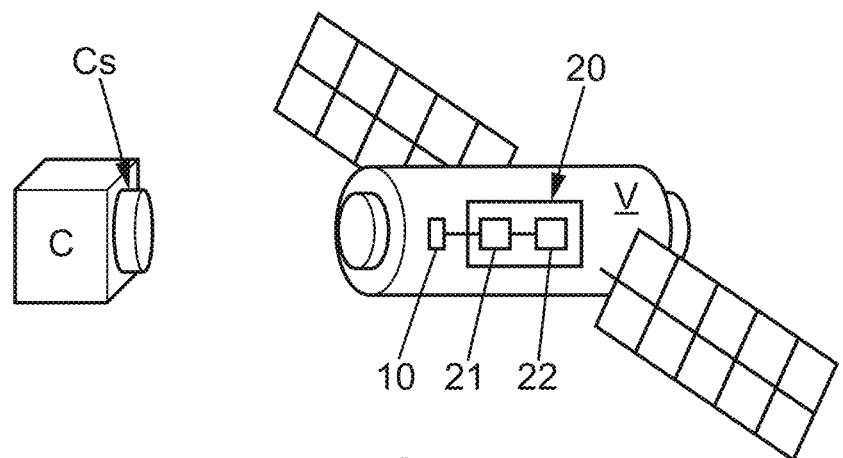
FIG. 2a schematically represents a first variant of a system allowing implementation of the method.
Figure 2B:
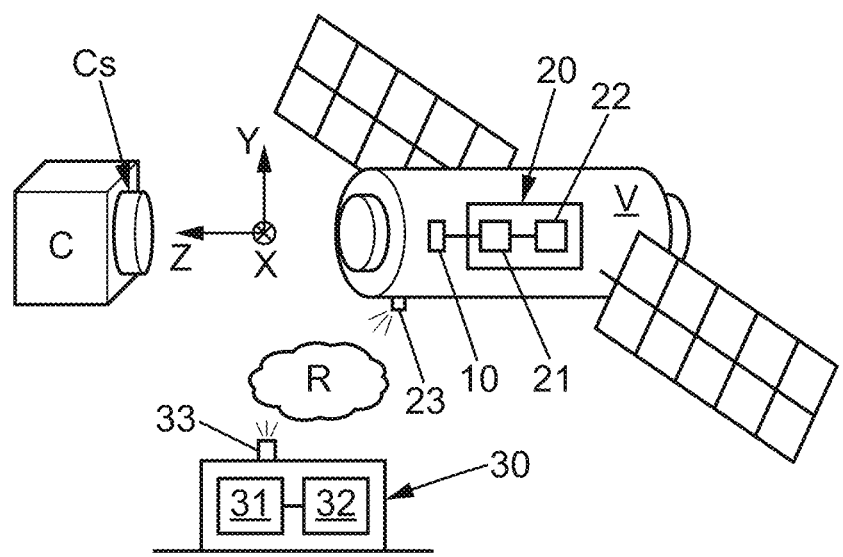
FIG. 2b schematically represents a second variant of a system allowing implementation of the method.

We will now describe the main steps of a method for locating a target relative to a vehicle according to one embodiment of the invention. With reference to FIGS. 2a and 2b, this method advantageously falls within a context of an air or space rendezvous, where a vehicle such as a spacecraft or aircraft captures a stream of images of a target which it is approaching, determines the placement of the target by real-time analysis of the captured images, and adapts the vehicle navigation commands in real time according to the placement thus determined.

As will be seen in more detail below, this method is therefore advantageously implemented in real time on a stream of images, at a frequency corresponding to the capture frequency of the images, which depends on the relative movement between the two objects, and which can range from 0.1 Hz to 100 Hz.

FIG. 2a shows a first embodiment of a system for implementing the method. This system comprises a sensor 10, on board a vehicle V and suitable for capturing images of the target C. The sensor 10 may be a remote laser sensing device or LIDAR (acronym for "Light Detection And Ranging"), or a monocular or stereo camera.

The system further comprises a control unit 20 comprising at least one computer 21 and a memory 22. The computer is for example a processor or a microprocessor.

The memory stores the code instructions necessary for implementing all or part of the method, and the computer is suitable for executing these code instructions.

In an alternative embodiment shown in FIG. 2b, part of the method can be implemented on the ground to further lighten the calculations implemented by the on-board computer 21, and if necessary to allow implementing additional processing which could not be carried out by the computer 21. This can also make it possible to have uniformity in the processing implemented by the ground system for a plurality of vehicles with onboard systems equipped with different processing capacities.

In this case, the system further comprises a processing unit 30 on the ground, comprising a memory 32 and a computer 31. Computer 31 and memory 32 can then have superior performance and characteristics than computer 21 and memory 22, because they are not constrained by the same integration and power issues as in the vehicle V.

Advantageously, the system can further comprise means of communication between the processing unit on the ground 30 and the on-board processing unit 20, these means of communication advantageously comprising wireless connection interfaces 23,33 on each side for connecting to a communication network T such as the Internet, for example by Wi-Fi, 3G, 4G, or by satellite communication.

The target C is a device comprising a three-dimensional external component Cs presenting a quadratic surface. The quadratic surface may be for example: a cylinder, a cone or a truncated cone, a sphere, a paraboloid of revolution or a section of a paraboloid of revolution.

According to a first advantageous example, the target C can be a satellite, a module of a space station, or any other spacecraft whose three-dimensional external component Cs presenting a quadratic surface is a launcher interface ring. In this case, the quadratic surface is a cylinder or a truncated cone. According to a second advantageous example, the target C can be a satellite, or a spacecraft whose three-dimensional external component Cs presenting a quadratic surface is a nozzle of a liquid apogee engine (LAE). In this case the quadratic surface is a truncated cone, a parabola, or a truncated parabola.

Alternatively, the three-dimensional external component Cs of the target may have a spherical shape.

The dimensions of the three-dimensional external component Cs presenting a quadratic surface of the target are known from the model of the target, these dimensions being stored in the memory 22 of the system 20 of the vehicle or in the memory 32 of the ground system 30. For example, in the case where this component is a launcher interface ring, the dimensions include at least the diameter of the ring. The dimensions may also include a thickness of the ring, meaning the dimension separating the inner wall of the ring from the outer wall.

In the case where the component Cs is a nozzle of a liquid apogee engine, the dimensions may include the maximum diameter of the nozzle, at its mouth, as well as the thickness of the nozzle.

Figure 1:
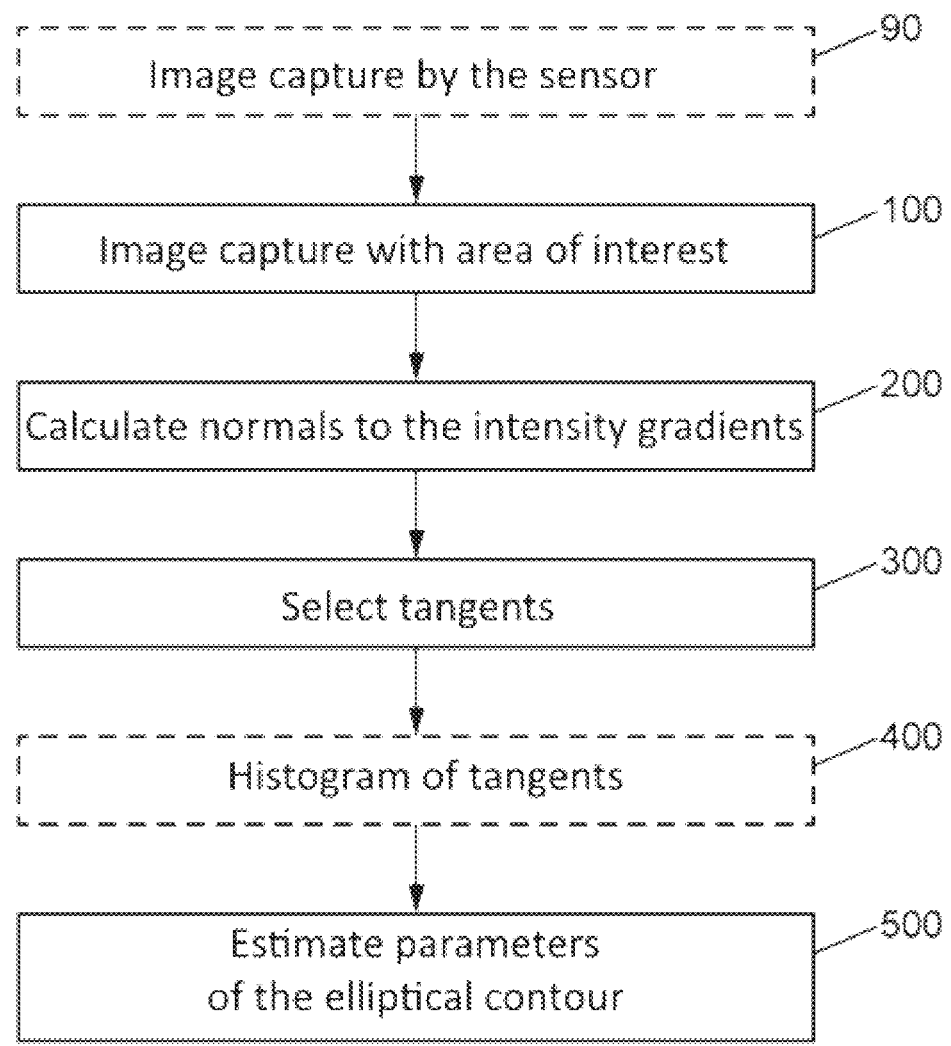
FIG. 1 schematically illustrates the main steps of a method for locating a target according to one embodiment of the invention.

Referring to FIG. 1, the main steps of a method for locating a target according to one embodiment of the invention are represented, the method being implemented by computer 21 of the vehicle or computer 31 of the ground system. This method is based on processing an image of the target where the three-dimensional external component Cs of the target appears as an elliptical contour, and comprises defining the parameters of this elliptical contour. This definition of parameters then makes it possible to deduce, as the geometry of the component Cs is known, the distance between the vehicle and the target as well as the position of the target relative to the vehicle.

The method comprises a first step 100, by the computer 21, 31, of capturing an image I of the target C, the image comprising a delineated area of interest Z in which the three-dimensional external component Cs of the target C is visible as an elliptical contour.

The image of the target C is captured by the sensor 10 of the vehicle V. The shape of the projection of the three-dimensional external component Cs of the target onto the image depends essentially on the position of the sensor 10 relative to this component during the image acquisition. Indeed, for all the shapes of quadratic surfaces given above, there exists at least one plane such that the projection of one of these surfaces onto a plane is an ellipse. In fact, the capture of an image in which the plane of the object is parallel to such a plane makes it possible to obtain an elliptical contour of the component Cs on the image.

For example, for this component Cs to form an elliptical contour on the image, in the case of a launcher interface ring or an apogee engine nozzle, the sensor 10 must be located preferably facing the ring or the mouth of the nozzle, as is schematically illustrated in [FIG. 2a] and [FIG. 2b], which is often the case during an approach phase. However, it is not necessary for the sensor 10 to be aligned with the axis of the ring or nozzle.

Preferably, the shape of the area of interest corresponds to that of the elliptical contour, meaning that it itself has the shape of an ellipse, and its dimensions are adapted according to the dimensions of the elliptical contour, such that the area of interest includes the fewest possible pixels of the image that are not part of the elliptical contour.

In one embodiment, step 100 is implemented by the computer 21 of the vehicle, and comprises the capturing of the image of the target by the vehicle sensor and the delineation of the area of interest around the elliptical contour.

In another embodiment, the image of the target is captured by the vehicle sensor during a step 90, then this image is sent to the ground, where the area of interest is delineated around the elliptical contour either by the computer 31 of the ground system or by an operator, then the image on which the area of interest is delineated is sent back to the computer 21 of the vehicle V, which receives it during step 100, in order to implement the rest of the processing.

According to yet another embodiment, the image of the target is captured by the vehicle sensor during a step 90, then this image is sent to the ground, where the area of interest is delineated around the elliptical contour by computer 31 or by an operator during step 100, and the rest of the processing is carried out by computer 31. Alternatively, the area of interest can be delineated by computer 21 before sending the image to the ground system, and step 100 then comprises receiving the image on which the area of interest has already been delineated.

In cases where the area of interest is delineated by a computer 21, 31, this delineation can advantageously be implemented based on a previous iteration of estimating the position of the target relative to the vehicle, and on the trajectory of the vehicle relative to the target. For example, in the case of a trajectory that is a line directed towards the three-dimensional external component Cs of the target, we can consider the center of the elliptical contour to be the same as in the previous estimate, and we can estimate one or each radius of the elliptical contour on the basis of a variation relative to the preceding radius (radii) and of the respective trajectory and speeds of the vehicle and target.

The method then comprises a step 200 of calculating, for each of a plurality of pixels of the area of interest in the image, an intensity gradient of the image around the pixel. In one embodiment, this step is implemented for all pixels of the area of interest in the image.

Two orthogonal axes X, Y being defined on the image, for a pixel $X_i$ of the image with coordinates $(x_i, y_i)$, the intensity gradient of the image around the pixel is defined by:

$$\nabla I(x_i, y_i) = [\nabla_x I(x_i, y_i), \nabla_y I(x_i, y_i)]^T$$

where $\nabla_x$ is the change in intensity of the image in the X direction around the pixel, and $\nabla_y$ is the change in intensity of the image in the Y direction around the pixel.

During the same step 200, the computer 21, 31 then determines, for each pixel for which the intensity gradient of the image has been calculated, the parameters of a line presenting a direction normal to the gradient at said pixel. Indeed, in the case where the gradient calculated at a pixel is non-zero, it is possible to define the parameters $[a_i, b_i, c_i]^T$ of the line $L(x_i, y_i)$ of equation $ax_i + by_i + c_i = 0$, passing through pixel i $(x_i, y_i)$ and presenting a direction normal to the gradient as follows:

$$L_i(x_i, y_i) = \left[ a = \frac{\nabla_x I(x_i, y_i)}{\|\nabla I(x_i, y_i)\|}, b = \frac{\nabla_y I(x_i, y_i)}{\|\nabla I(x_i, y_i)\|}, c = -\frac{\nabla_x I(x_i, y_i)x_i + \nabla_y I(x_i, y_i)y_i}{\|\nabla I(x_i, y_i)\|} \right]$$

Figure 3:
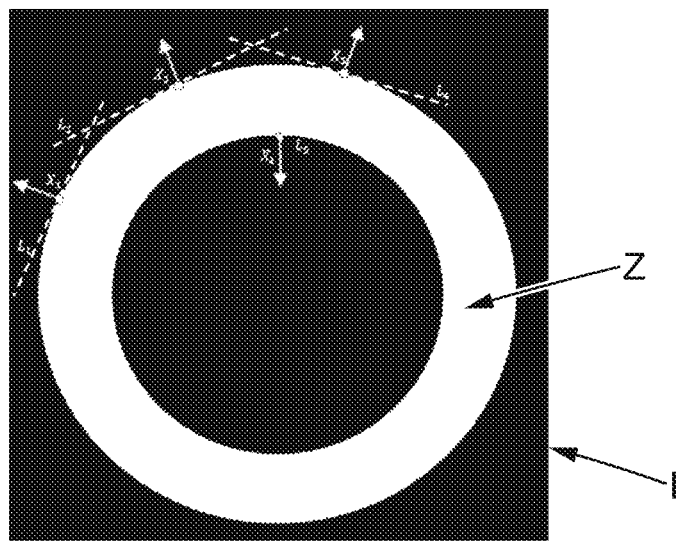
FIG. 3 illustrates the calculation of gradients at certain pixels of an area of interest in an image.

Now, as can be seen for example in FIG. 3, the pixels of the area of interest for which the intensity gradient is non-zero are the edges of the elliptical contour on the image, and the line whose direction is normal to the intensity gradient of the image at these points is actually a tangent to the elliptical contour. Thus, step 200 makes it possible to determine the parameters of tangents to the elliptical contour, in order to then be able to estimate said contour.

Figure 5:
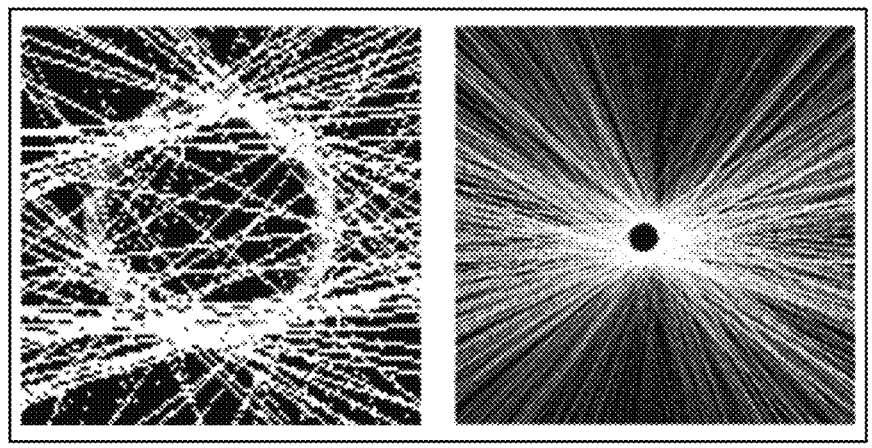
FIG. 5 represents the tangents calculated at each pixel of the area of interest in an image, respectively before and after the selection of tangents.

However, as can be seen for example in the illustration on the left in [FIG. 5], some lines calculated in step 200 may comprise parasitic lines which are not tangents to the elliptical contour. The presence of these lines may for example result from intensity variations linked to textures visible in the image or caused by coatings such as thermal coatings, or even from irregularities in the elliptical contour related for example to small protruding parts such as fasteners.

The method thus comprises a step 300 of selecting, among the set of lines whose parameters have been calculated in step 200, those lines which are tangents to the elliptical contour. To do this, with reference to [FIG. 4], for each pixel for which the parameters of the line normal to the intensity gradient of the image at said pixel have been calculated, the computer 21, 31 calculates the angle β formed by this normal line and a line connecting the pixel to the estimated center O of the elliptical contour.

The estimated center O of the elliptical contour can be determined automatically by shape recognition, for example at the same time as the delineation of the area of interest around said contour. Alternatively, if the area of interest is delineated by an operator, the estimated center O of the elliptical contour can be indicated by the operator during the same step.

Figure 4:
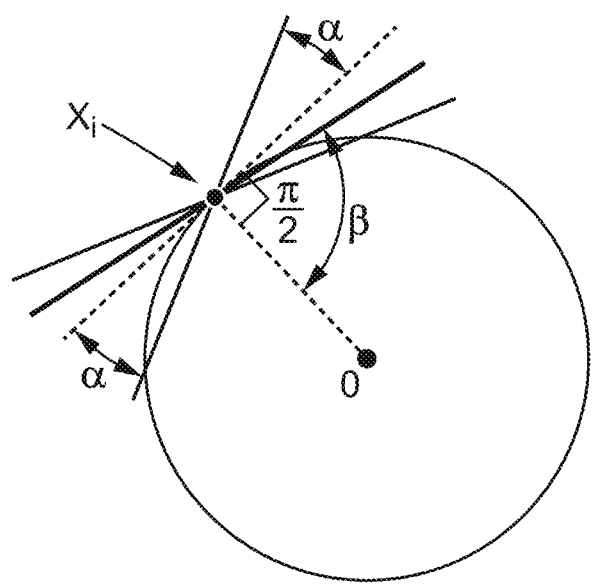
FIG. 4 represents the implementation of the selection of tangents.

In the non-limiting example of [FIG. 4], the elliptical contour is a circle; in the case where it is an ellipse the estimated center of the elliptical contour is the intersection between the major axis and the minor axis of the ellipse. In this figure, we have represented the line passing through a pixel i and the estimated center O of the elliptical contour with dotted lines, and another line perpendicular to the first with dotted lines. Two lines passing through pixel i and forming an angle α with this perpendicular are represented with solid lines; these lines represent the tolerance allowed for a line normal to the intensity gradient of the image at a pixel to be considered as a tangent to the elliptical contour. α is preferably less than or equal to 10°, for example equal to 5°. The normal to the intensity gradient of the image calculated for pixel i is represented with a bold solid line.

In step 300, the computer 21,31 determines whether the calculated angle β is equal to π/2 plus or minus the tolerance α:

$$\left|\beta - \frac{\pi}{2}\right| \leq \alpha$$

If such is the case, then the computer 21,31 selects the considered line as a tangent to the elliptical contour.

In the illustration to the right in [FIG. 5], the lines which have been selected by performing step 300 using the lines in the illustration to the left are represented. One will note that there are now only tangents to the contour, and in particular there are no longer any lines crossing the elliptical contour.

The method then comprises a step 500 of estimating the parameters of the elliptical contour based on the tangents selected in step 300.

The projection of the three-dimensional component Cs of the target onto the image is an elliptical contour which can be modeled by the following equation: $f(x,y):=Ax^2+Bxy+Cy^2+Dx+Ey+F=0$, which can be reformulated in an equivalent manner, for a point $X_i$ $(x_i,y_i)$:

$$X_i^T H X_i = \begin{bmatrix} x_i & y_i & 1 \end{bmatrix} \begin{bmatrix} A & \frac{B}{2} & \frac{D}{2} \\ \frac{B}{2} & C & \frac{E}{2} \\ \frac{D}{2} & \frac{E}{2} & F \end{bmatrix} \begin{bmatrix} x_i \\ y_i \\ 1 \end{bmatrix}$$

We denote as θ the vector $[A,B,C,D,E,F]^T$ of the parameters of the elliptical contour that is to be estimated.

For each point $X_i$ for which the parameters of a tangent $L_i$ to the elliptical contour have been calculated, we have the following relation: $L_i$=H$X_i$ and:

$$X_i^T H X_i = X_i^T H^T (H^T)^{-1} H X_i = (HX_i)^T H^{-1}(HX_i) = L_i H^{-1} L_i = 0$$

The estimation of the vector θ of the parameters of the elliptical contour can be implemented from the set of points $X_i$ for which a tangent to the elliptical contour has been calculated, using a least squares algorithm, by:

$$\hat{\theta} = \mathrm{argmin}\left(\sum_i (X_i^T H X_i)^2\right)$$

which according to the previous equation becomes:

$$\hat{\theta} = \mathrm{argmin}\left(\sum_i (L_i H^{-1} L_i)^2\right)$$

Moreover, taking into account the elliptical shape of the contour, an additional constraint $4AC-B^2=1$ can be set. The use of the parameters of the tangents in a least squares algorithm therefore makes it possible to estimate the shape of this elliptical contour on the image with precision.

As the geometry of the three-dimensional external component Cs of the target C is known, it is then possible to deduce therefrom, with precision, the relative position (including the distance and the pose) of the target with respect to the vehicle.

Advantageously, but optionally, the method may also comprise a step 400 which is implemented after the step of selecting the tangents and before the step of estimating the parameters of the elliptical contour on the image. During this step 400, the computer 21, 31 produces a histogram of tangents selected as a function of the distance of the tangents between the estimated center of the elliptical contour and the pixel at which each tangent was calculated. The histogram therefore indicates the number of tangents N as a function of the distance D between the center and the pixel where a tangent is calculated.

Figure 6:
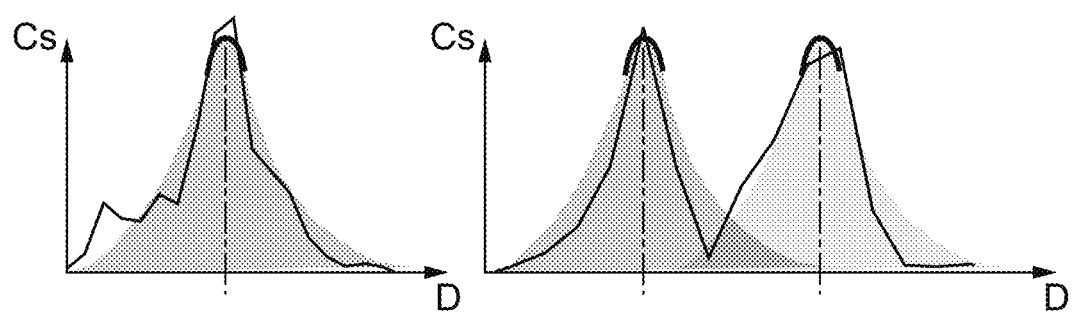
FIG. 6 shows two examples of histograms of tangents as a function of the distance to the estimated center of the elliptical contour on the image.

Two examples of histograms have been shown in [FIG. 6]. The act of producing this histogram makes it possible to reveal a single peak (illustration on the left in FIG. 6) or two peaks (illustration on the right in FIG. 6). The case of a single peak corresponds to the case where the inner and outer edges of the elliptical outline cannot be distinguished from each other, typically when the distance between the target and the vehicle is too great. On the other hand, the case of two peaks corresponds to the case where the inner and outer edges are distinct, and therefore the elliptical contour has an elliptical inner edge and an elliptical outer edge.

In this second case, step 400 then comprises the distribution of the tangents into two subsets, according to the distance between the pixel corresponding to the tangent and the estimated center of the elliptical contour, the first subset comprising the set of tangents to the inner edge of the elliptical contour, and the second subset comprising the set of tangents to the outer edge of the elliptical contour.

If two subsets of tangents have been formed, then step 500 of estimating the parameters of the elliptical contour is implemented twice, a first time to estimate the parameters of the inner edge, with the subset of tangents corresponding to this edge, and a second time to estimate the parameters of the outer edge, with the subset of tangents corresponding to that edge.

This embodiment can preferably be implemented when the object to be detected in the image is a launcher interface ring. In the case of a nozzle of a liquid apogee engine, this may be superfluous: since the thickness of the nozzle is about 1 to 2 mm, only one circle will be detected on the image.

In one embodiment, step 400 can be carried out systematically, and step 500 is carried out only once if there is only one peak in the histogram of the tangents and twice if there are two peaks. This allows greater precision in the estimation which can then be made of the relative position of the target relative to the vehicle.

The invention claimed is:

1. A method for locating a target (C) relative to a vehicle (V), the target (C) comprising at least one three-dimensional external component (Cs) presenting a quadratic surface, the method being implemented by a computer and comprising:
   capturing an image (I) of the target comprising an area of interest (Z) in which the external component (Cs) of the target is visible in the form of an elliptical contour,
   for each of a plurality of pixels of the area of interest (Z) in the image, calculating an intensity gradient of the image around the pixel, and determining, based on the intensity gradient, the parameters of a line presenting a direction normal to the gradient at said pixel,
   selecting, among the set of determined lines, a set of lines that are tangents to the elliptical contour,
   estimating the parameters of the elliptical contour on the image based on the parameters of the tangents to the elliptical contour,
   wherein selecting lines that are tangents to the elliptical contour comprises:
   calculating, for each pixel, an angle formed by the line presenting a direction normal to the gradient at said pixel and by a line connecting said pixel to an estimated center of the elliptical contour, and
   selecting the line presenting a direction normal to the gradient at said pixel as a tangent to the elliptical contour if the calculated angle is equal to a right angle plus or minus a predetermined tolerance.

2. The method according to claim 1, wherein the area of interest is an ellipse delineated around the elliptical contour of the image, and an intensity gradient is calculated for all pixels of the area of interest in the image.

3. The method according to claim 1, wherein the parameters of the elliptical contour are estimated by a least squares algorithm.

4. The method according to claim 1, further comprising, once the tangents to the elliptical contour have been selected, producing a histogram of said tangents as a function of the distance between an estimated center of the elliptical contour and the pixel at which each tangent is respectively calculated.

5. The method according to claim 4, wherein the histogram comprises two peaks respectively corresponding to an inner edge and an outer edge of the elliptical contour on the image, and the method then comprises dividing the tangents into two sets respectively corresponding to each edge, and
   the step of estimating the parameters of the elliptical contour on the image is carried out respectively for the inner edge and for the outer edge, based on the parameters of the tangents respectively belonging to the two sets.

6. The method according to claim 1, wherein the step of capturing the image of the target comprising an area of interest comprises a step of capturing an image of the target in which the three-dimensional external component is visible in the form of an elliptical contour, and a step of delineating an area of interest around said contour.

7. The method according to claim 6, wherein the delineation of the area of interest is implemented based on a previous estimate of the position of the target relative to the vehicle and based on the trajectory of the vehicle relative to the target.

8. A non-transitory computer-readable medium, comprising code instructions for implementing the method according to claim 1, when it is implemented by a computer.

9. A computer configured to implement the method according to claim 1.

* * * * *